United States Patent [19]

Kimura

[11] Patent Number: 5,553,031
[45] Date of Patent: Sep. 3, 1996

[54] DMA OPERABLE IN COMPLIANCE WITH POINTERS, EACH INCLUDING A DISCRIMINATION BIT

[75] Inventor: Takayuki Kimura, Tokyo, Japan

[73] Assignee: NEC Corporation, Tokyo, Japan

[21] Appl. No.: 275,408

[22] Filed: Jul. 15, 1994

[30] Foreign Application Priority Data

Jul. 15, 1993 [JP] Japan .................................. 5-175486

[51] Int. Cl.⁶ ................................................. G11C 13/00
[52] U.S. Cl. ................................ 365/230.01; 365/230.08
[58] Field of Search ........................ 365/189.05, 230.01, 365/230.08; 364/200.07

[56] References Cited

U.S. PATENT DOCUMENTS 4,133,030  1/1979  Huettner et al. ..................... 364/200
5,341,339  8/1994  Wells ..................................... 365/218
5,400,286  3/1995  Chu et al. .............................. 365/218

FOREIGN PATENT DOCUMENTS 0524530  1/1993  European Pat. Off. .

*Primary Examiner*—Terrell W. Fears
*Attorney, Agent, or Firm*—Foley & Lardner

[57] ABSTRACT

Comprising a data memory region (21) for data and pointer memory sections (23) for pointers controlling transfer of the data to or from an I/O device for a CPU, a memory (13) for DMA comprises in each pointer memory section a one-bit memory area for a discrimination or skip bit (Bi) indicative of whether the transfer should proceed or be skipped at one of the data that is controlled by the pointer stored in the pointer memory section under consideration. Preferably, the discrimination bit represents binary zero and one values when the transfer should proceed and be skilled, respectively. It is preferred to form a DMA controller together with the memory in an LSI semiconductor device.

13 Claims, 3 Drawing Sheets

DMA OPERABLE IN COMPLIANCE WITH POINTERS, EACH INCLUDING A DISCRIMINATION BIT

BACKGROUND OF THE INVENTION

This invention relates to direct memory access (DMA) used in a peripheral device of a central processing unit (CPU) in transferring data between a memory device and an input/output device in compliance with a plurality of pointers. More particularly this invention relates to a direct memory access method and to a direct memory access system for carrying out the direct memory access of the type described. The direct memory access system is often called a descriptor table system in the art. Its direct memory access controller is preferably implemented as a semiconductor device of large scale integration (LSI).

In the manner which will later be described in greater detail a conventional direct memory access system comprises a direct memory access controller connected to a system bus together with a central processing unit and a memory device and to an input/output or similar external device. Transfer of the data between the memory device and the input/output device is controlled in compliance with a plurality of pointers. On transferring the data, the direct memory access controller refers to the pointers. The data are directly transferred without use of the central processing unit. The direct memory access is therefore operable at a high speed in contrast to program control and is advantageous in dealing with a great amount of data as blocks.

The conventional direct memory access system is, however, incapable of interrupting or suspending the transfer at one of the pointers. It has therefore been unavoidable on interrupting the transfer to rearrange the pointers by omitting the above-mentioned one of the pointers. This is troublesome and reduces the speed of transfer of the data.

SUMMARY OF THE INVENTION

It is consequently an object of the present invention to provide a direct memory access method of transferring data between a memory device and an input/output device in compliance with a plurality of pointers, by which method it is readily possible to skip one or more of the pointers while transfer of the data is in progress.

It is another object of this invention to provide a direct memory access method which is of the type described and in which it is unnecessary to rearrange the pointers on skipping one or more of the pointers.

It is a different object of this invention to provide a direct memory access system for carrying out the direct memory access method of the type described.

Other objects of this invention will become clear as the description proceeds.

In accordance with an aspect of this invention, there is provided a direct memory access method of transferring data between a memory device and an input/output device with transfer of the data controlled by a plurality of pointers, wherein a discrimination bit is included in each of the pointers to indicate whether or not the transfer should proceed.

In accordance with a different aspect of this invention, there is provided a direct memory access system which is for transferring data between a memory device and an input/output device with transfer of the data controlled by a plurality of pointers and which comprises: (A) direct memory access control means connected to the memory device and to the input/output device for controlling the transfer in compliance with the pointers, and (B) system control means connected to the direct memory access control means for controlled the transfer by the direct memory access control means in response to a discrimination bit which in included in each of the pointers to indicate whether or not the transfer should proceed.

DESCRIPTION OF THE PREFERRED EMBODIMENT

Figure 1:
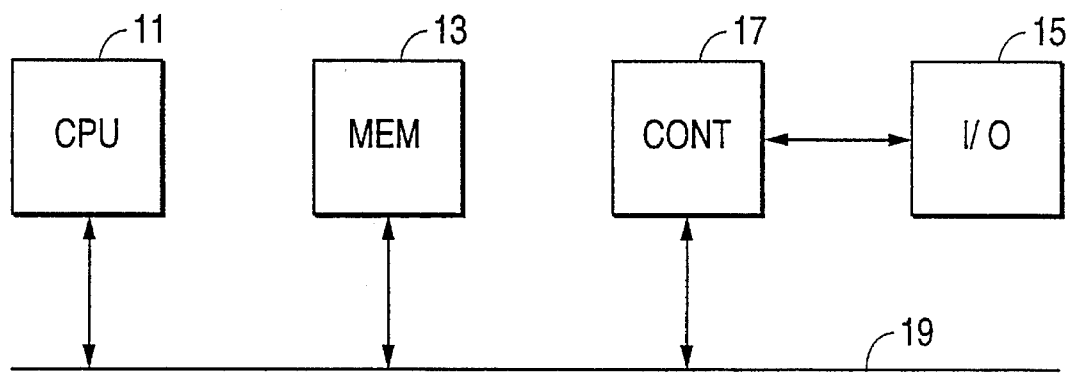
FIG. 1 shows in blocks a direct memory access system in general.

Referring to FIG. 1, a direct memory access (DMA) system with be described in general in order to facilitate an understanding of the present invention. In the manner known in the art, the direct memory access system is used as a peripheral device of a central processing unit (CPU) 11 in directly transferring data between a memory device (MEM) 13 and an input/output device (I/O) 15 and comprises a direct memory access controller (CONT) 17 connected to the input/output device 15 and to a system bus 19 together with the central processing unit 11 and the memory device 13. The direct memory access controller 17 comprises a base address register which is known in the art and is therefore not illustrated.

In the example being illustrated, the input/output device 15 is a flexible disk memory. As a consequence, the direct memory access controller 17 is a flexible disk controller. At any rate, the direct memory access controller 17 deals with transfer of the data between the memory device 13 and the input/output device 15 in compliance with a plurality of pointers which will presently be described.

Figure 2:
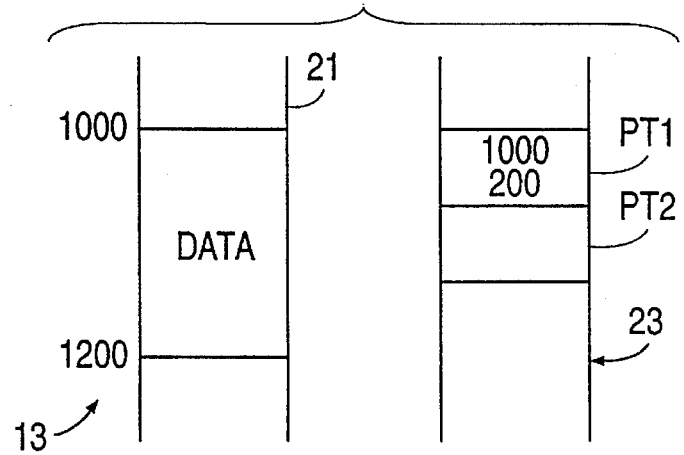
FIG. 2 exemplifies a content of a conventional memory device of the direct memory access system of the type depicted in FIG. 1.

Turning to FIG. 2 with FIG. 1 continuously referred to, the memory device 13 comprises a in a conventional direct memory access system a data memory region 21 and a pointer memory region 23. The data memory region 21 comprises a great number of data memory addresses, each for one unit of the data which are subjected to transfer to and from the input/output device. The pointer memory region 23 similarly comprises a plurality of pointer memory sections, each comprising in turn a few pointer memory addresses. In the illustrated example, data are stored in the data memory addresses between a starting data address 1,000 and an ending data address 1,200. First and second pointers PT1 and PT2 are exemplified in two of the pointer memory sections. The first pointer indicates the data memory address 1,000 and a data length of 200 data memory addresses. Such a pointer furthermore indicates other information which will become clear as the description proceeds.

It will be surmised that a starting pointer address is stored in the base address register to indicate the first pointer. The direct memory access controller 17 reads the first pointer and analyzes its information. It will additionally be surmised that the other information indicates transfer of the data to the input/output device 15. The direct memory access controller 17 reads the data and transfers the data from the memory device 13 to the input/output device 15. Subsequently, the direct memory access controller 17 deals with other pointers which follow the first pointer.

Figure 3:
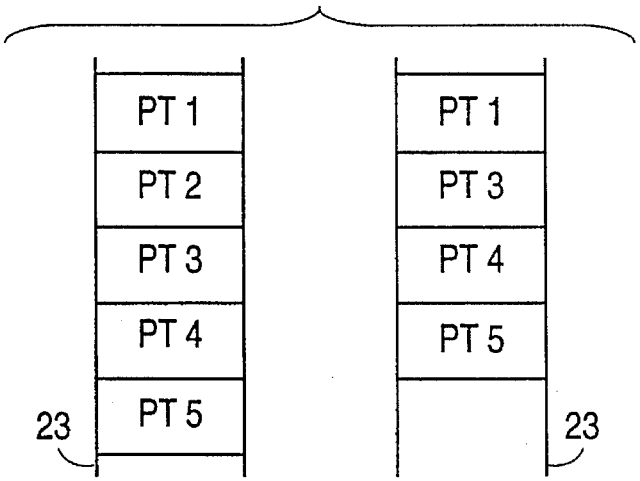
FIG. 3 schematically shows operation of a conventional direct memory access system of the type depicted in FIG. 1.

Referring afresh to FIG. 3 and again to FIGS. 1 and 2, it will be assumed in the manner exemplified in FIG. 3 on the left-hand side that first through fifth pointers PT1 to PT5 are stored in the pointer memory region 23 of the memory device 13. The first pointer is indicated by the base address register of the direct memory access controller 17. The fifth pointer includes an end pointer bit (not shown) as the above-mentioned other information to indicate that a block of pointers ends at the fifth pointer. In this event, the direct memory access controller 17 transfers the data of the data memory region 21 to the input/output device 15 in compliance with the first through the fifth pointers.

It will now be assumed that the data indicated by the second pointer PT2 should not be subjected to the transfer for some reason or another. Such a necessity may arise from lack in the input/output device 15 of a destination to which the data in question should be transferred. Alternatively when such data are transferred in compliance with the first to the fifth pointers from the input/output device 15 to the memory device 13, the necessity may rise from lack of a source in the input/output device 15.

In such an event, rearrangement of the pointers has been indispensable in the conventional direct memory access system. More particularly, the block of the first to the fifth pointers is rearranged as depicted on the right-hand side of FIG. 3 into a rearranged block of first and third to fifth pointers with the second pointer PT2 emitted. The data must afresh be subjected to the transfer.

Figure 4:
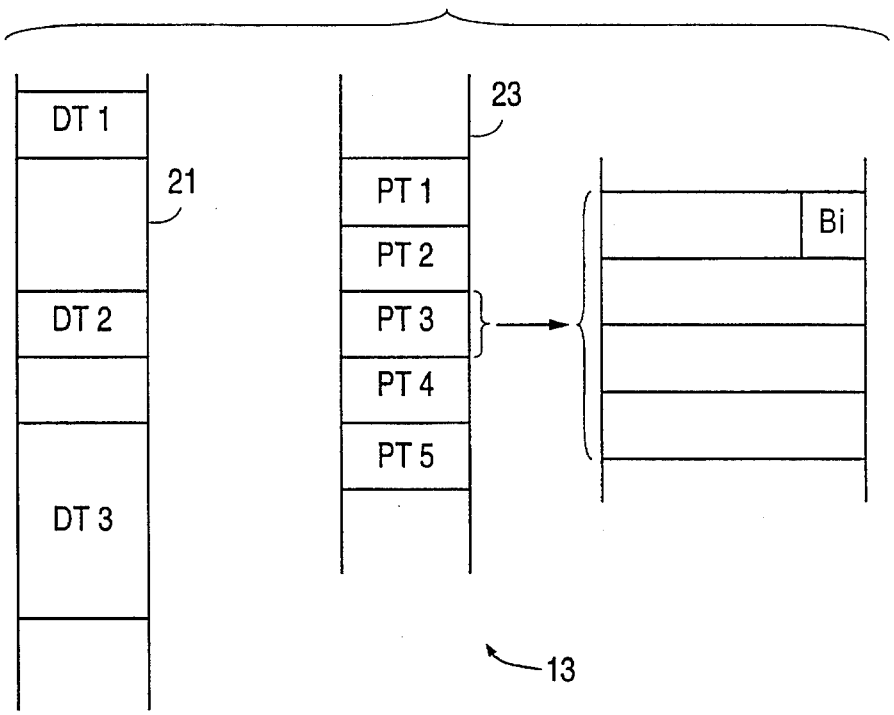
FIG. 4 exemplifies a content of a memory device of a direct memory access system which is of the type illustrated in FIG. 1 and is according to an embodiment of the instant invention.

Referring now to FIG. 4 with FIG. 1 again referred to, it should be noted in accordance with an embodiment of this invention that the direct memory access system is not different in hardware from the conventional direct memory access system illustrated with reference to FIG. 1. In FIG. 4, the memory device 13 comprises the data memory region 21 and the pointer memory region 23 depicted along a leftmost column and a middle column in the manner described in conjunction with FIG. 2.

In the data memory region 21 depicted in FIG. 4, first to third data DT1, DT2, and DT3 are exemplified at discrete data memory sections. In the pointer memory region 23, a block of first through fifth pointers PT1 to PT5 is exemplified like on the left-hand side of FIG. 3. It will be surmised that the first to the third pointers indicate transfer of the first to the third data. Along a rightmost column of FIG. 4, the third pointer PT3 is depicted on an enlarged scale with the above-mentioned pointer memory addresses depicted in one of the pointer memory sections that is used in storing the third pointers.

It should be understood as illustrated along the rightmost column of FIG. 4 that each pointer includes a discrimination bit Bi. When the third datum should be transferred to of from the input/output device 15, this discrimination bit is made to represent one of two binary values. For example, the discrimination bit represents in this event a binary zero value when the third pointer should be processed as usual. When the third datum should not be subjected to the transfer, the discrimination bit is made to represent a binary one value. It is therefore possible to refer to each discrimination bit alternatively as a skip bit. In order to store the discrimination bit, one of the pointer memory addresses in each pointer memory section comprises a one-bit memory area.

Reviewing FIGS. 1 through 4, it should be understood that the discrimination bit need not be included in one of the pointers that stands last in the block of pointers. It is therefore possible to substitute the above-mentioned end pointer bit for the discrimination bit in such a last-standing pointer.

Figure 5:
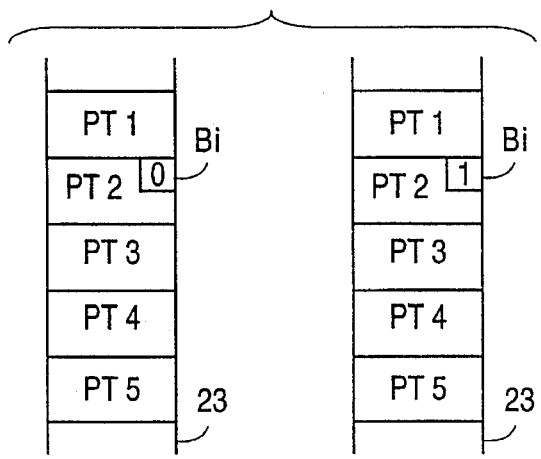
FIG. 5 schematically shows operation of the direct memory access system mentioned in conjunction with FIG. 4.

Turning to FIG. 5 with FIGS. 1 and 4 continuously referred to, it will be assumed that the first to the third data and also forth should be transferred to or from the input/output device 15. The discrimination or skip bit represents the binary zero value in the manner exemplified in the second pointer PT2 on the left-hand side of FIG. 5. It will now be assumed that the transfer should not proceed as regards the second datum. In such an event, the discrimination bit represents the binary one value as represented on the right-hand side of FIG. 5 in connection with the second pointer.

It is preliminarily known that which of the data should not be transferred. The discrimination bit is therefore preliminarily changed from the binary zero value to the binary one value in one or more pointers in correspondence to the datum or data which should be skipped during progress of the transfer.

Referring afresh to FIG. 6 and again to FIGS. 1, 4, and 5, the direct memory access controller 17 is preferably formed in a semiconductor device of large scale integration. The system bus 19 of FIG. 1 consists of a data bus 25, an address but 27, and a control bus 29. The direct memory access controller 17 is connected to these three busses 25 to 29. Connected to these three busses 25 to 29 are the central processing unit 11 and the memory device 15 which is formed typically in another area of the semiconductor device that is not depicted in FIG. 6. The input/output device 15 is connected to the data bus 25 and consequently to the direct memory access controller 17. It should furthermore be noted that the direct memory access controller 17 comprises the above-described base address register leftwardly of the semiconductor device.

In the direct memory access system being illustrated, the data bus 25 is for transmitting the data between the memory device 13 and the input/output device 15 through the semiconductor device and the pointers from the memory device 13 to the semiconductor device. The address bus 27 is for transmitting the address signals from the base address register to the semiconductor device and is the memory device 13. Between the semiconductor device and the memory device 13 and also the central processing unit 11, the control bus 29 transmits various control signals, such as a word strobe signal, a write strobe signal, memory chip select signals for selecting at least one of the input/output devices, such as the input/output device 15, an LSI chip select signal, a hold request signal, and a hold request acknowledge signal.

In such a direct memory access system, the central processing unit 11 allows and does not allow in co-operation with the direct memory access controller 17 use of the system bus 19 in accessing the memory device 13. The hold request signal is for requesting the central processing unit 11 to allow the direct memory access controller 17 use of the three busses 25 to 29. The hold request acknowledge signal is produced by the central processing unit 11 to confirm acceptance of the hold request signal and to allow use of the three busses 25 to 29 by the memory device 13, the input/output devices, such as 15, and the direct memory access controller 17.

Figure 6:
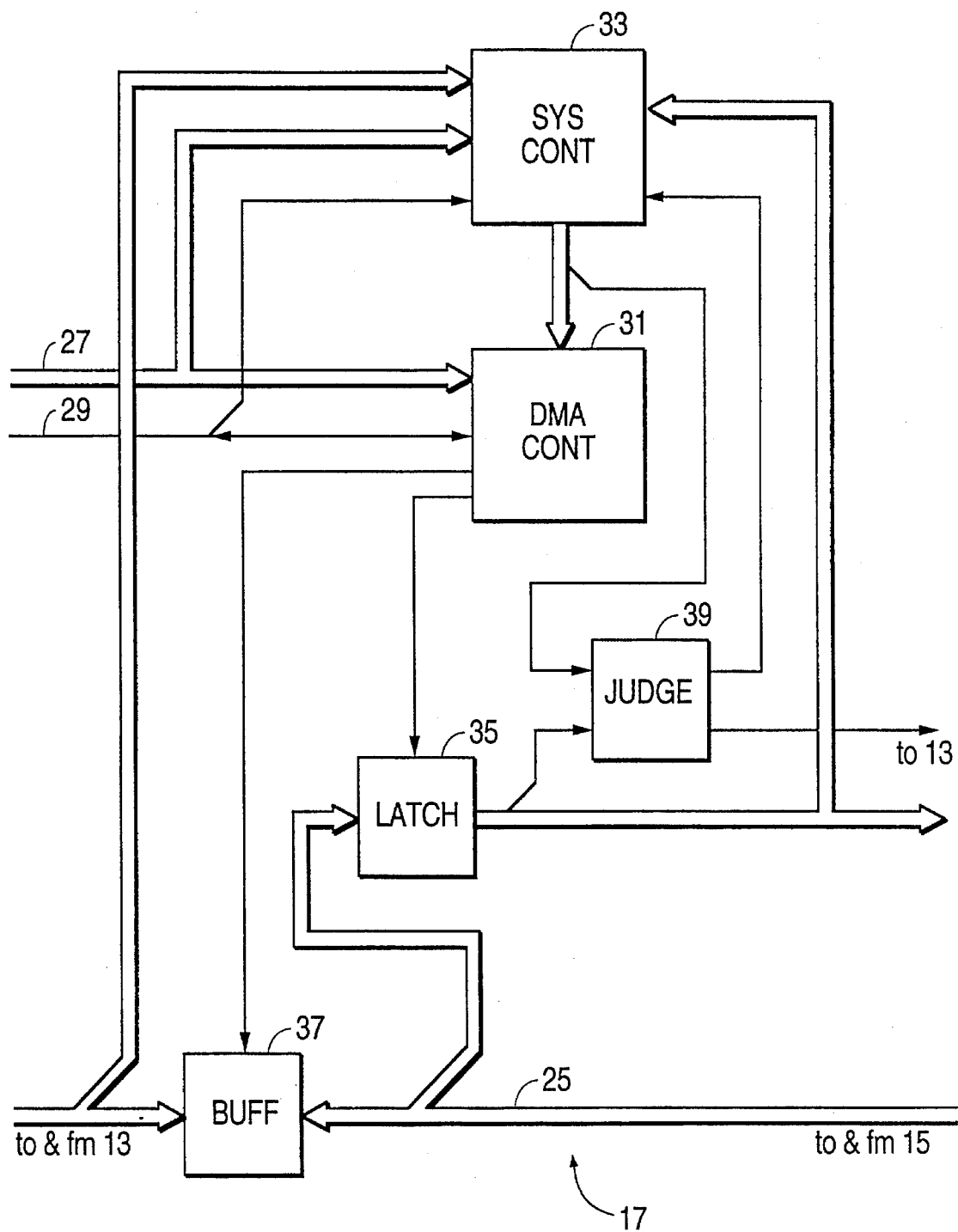
FIG. 6 is a schematic front view of a semiconductor device in which a direct memory access controller is formed for use in a direct memory access system of this invention.

In FIG. 6, the direct memory access controller 17 comprises a direct memory access control part (DMA CONT) 31 connected to the address bus 27 and to the control bus 29. Connected to the direct memory access control part 31 in the direct memory access controller 17, a system control part (SYS CONT) 33 is supplied through the three busses 25 to 29 with the pointers, the address signals, and the write strobe signal to control whole of the direct memory access controller 17 by supplying the direct memory access control part 31 with a pointer collection command. Responsive to the pointer collection command, the direct memory access control part 31 collects the pointers as follows from the memory device 13 through the system control part 33.

Receiving the pointer collection command, the direct memory access control part 31 sends the hold request signal to the central processing unit 11 through the control bus 29. Receiving the hold request acknowledge signal from the central processing unit 11, the direct memory access control part 31 drives the address bus 27 and the write strobe signal on the control bus 29 to read the pointers from the memory device 13 as read pointers and to produce a pointer latch signal. Concurrently with production of the pointer latch signal, the direct memory access control part 31 produces a buffer drive signal.

In the direct memory access controller 17, a pointer latch part (LATCH) 35 is controlled by the pointer latch signal to latch the read pointers as latched pointers. A data bus bidirectional control buffer (BUFF) 37 is driven by the buffer drive signal to hold the data sent from the memory device 13 as held data if the pointers indicate transfer of the data to the input/output device 15. When the pointers indicate the transfer to the memory device is, the data bus bidirectional control buffer 37 holds the data sent from the input/output device 15 as the held data.

The read pointers and consequently the latched pointers include the discrimination or skip bits at time instants which are determined by the one-bit memory areas individually included in the pointer memory sections. Supplied with the latch pointers from the pointer latch part 35, the system control part 33 produces a judgement trigger pulse in synchronism with each discrimination bit included in the latched pointers. Supplied with the judgement trigger pulse and from the pointer latch part 35 with each discrimination bit concurrently with the judgement trigger pulse, a judgement part or circuit (JUDGE) 39 judges whether the discrimination bit under consideration represents the binary zero value or the binary one value.

Figure 7:
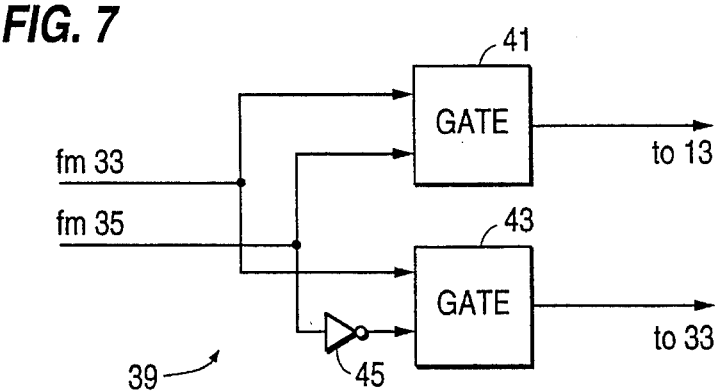
FIG. 7 shows in blocks a circuit used in the direct memory access controller depicted in FIG. 6.

Turning temporarily to FIG. 7 with FIG. 6 continuously referred to, the judgement part 39 comprises a first two-input gate circuit 41 supplied from the pointer latch part 35 with the discrimination bit and from the system control part 33 with the judgement trigger pulse to produce a next pointer trigger pulse. In the judgement part 39, a second two-input gate circuit 43 is supplied with the discrimination bit through an inverter circuit 45 and directly with the judgement trigger pulse to produce a transfer skip pulse.

Turning back to FIG. 6 with FIGS. 1 and 4 continuously referred to once again, the next pointer trigger pulse is delivered through the control bus 29 to the memory device 13 to make the memory device 13 supply the data bus 25 with a next contiguous one of the pointers as one of the read pointers. The transfer skip pulse is fed back to the system control part 33. Supplied with this transfer skip pulse, the system control part 33 makes through the direct memory access control part 31 the data bus bidirectional control buffer 37 supply the held data nowhere. In compliance with the discrimination bit indicative of skip of transfer, the datum is not delivered to the input/output device 15 from the memory device 13 or to the memory device 13 from the input/output device 15.

Reviewing FIG. 6, it is understood that a combination of the direct memory access control part 31 and the data bus bidirectional control buffer 37 serves as a direct memory access control means. Another combination of the system control part 33, the pointer latch part 35, and the judgement part 39 serves as a system control means. With reference to the discrimination of skip bit of each pointer, the system control means controls by the data bus bidirectional control buffer 37 the transfer of data by judging whether the discrimination bit indicates continuance or skip of the transfer.

What is claimed is:

1. A direct memory access method of transferring data between a memory device and an input/output device with transfer of said data controlled by a plurality of pointers, wherein a discrimination bit is included in each of said pointers to indicate whether or not transfer of corresponding data should proceed, comprising the steps of:

storing said pointers as stored pointers, each stored pointer including a corresponding discrimination bit; and skipping transfer of corresponding data between said memory device and said input/output device when the corresponding discrimination bit in the corresponding one of said stored pointers indicates not to proceed with said transfer.

2. A direct memory access method as claimed in claim 1, further comprising the steps of:

giving one of two binary values to said discrimination bit when said discrimination bit is to indicate to proceed with transfer of data between said memory device and said input/output device; and giving the other of said two binary values to said discrimination bit when said discrimination bit is to indicate not to proceed said transfer.

3. A direct memory access method as claimed in claim 2, wherein said one and said other of two binary values are a binary zero value and a binary one value.

4. A direct memory access method as claimed in claim 1, said stored pointers being stored as a block to be consecutively processed to transfer said data between said memory device and said input/output device, wherein in a stored pointer to be processed last, an end pointer bit is substituted for said discrimination bit.

5. A direct memory access system for transferring data between a memory device and an input/output device with transfer of said data controlled by a plurality of pointers, said direct memory access system comprising:

direct memory access control means connected to said memory device and to said input/output device for controlling the transfer in compliance with said pointers; and system control means connected to said direct memory access control means for controlling the transfer by said direct memory access control means in response to a discrimination bit included in each of said pointers to indicate whether or not transfer of corresponding data should proceed.

6. A direct memory access system as claimed in claim 5, said memory device comprising a data memory region for storing said data as stored data and a plurality of pointer memory sections for individually storing said pointers as stored pointers, wherein each of said pointer memory sections includes a one-bit memory area for said discrimination bit.

7. A direct memory access system as claimed in claim 6, wherein:

said one-bit memory area of each of said stored pointers stores a bit representative of one of two binary values as said discrimination bit when said discrimination bit indicates that said transfer should proceed;

said one-bit memory area of each of said stored pointers storing another bit representative of the other of said two binary values as said discrimination bit when said discrimination bit indicates that transfer of corresponding data should be skipped.

8. A direct memory access system as claimed in claim 7, wherein said one and said other of two binary values are a binary zero value and a binary one value.

9. A direct memory access system as claimed in claim 6, said pointer memory sections storing a block of stored pointers which should consecutively be processed by said direct memory access control means, wherein an end pointer bit is substituted for said discrimination bit in one of said stored pointers that should be last processed in said block.

10. A direct memory access system as in claim 5, wherein the direct memory access control means comprises:

a direct memory access control unit corrected to receive a pointer collection command and to read pointers in response thereof; and a data bus bidirectional control buffer connected to the direct memory access control unit to receive a buffer drive signal therefrom, the data bus directional control buffer holding data from one of the input/output device and the memory device and providing the held data to the other of the input/output device and the memory device in response to the buffer drive signal.

11. A direct memory access system as recited in claim 10, further comprising a central processing unit (CPU), wherein the direct memory access control unit sends hold request signal to the CPU through a control bus upon receipt of the pointer collection command, wherein the CPU sends a hold request acknowledge signal to the direct memory access control unit upon receipt of the hold request signal, and wherein the direct memory access control unit produces a write strobe signal to read the pointers from the memory device via the data bus directional control buffer in response to the hold request acknowledge signal.

12. A direct memory access system as recited in claim 11, wherein the system control means comprises:

a latch, a system control unit; and a judgement circuit, wherein the latch reads pointers from the memory in response to pointer latch signals received from the direct memory access controller and provides the latched pointers to the system control unit, wherein the system control unit produces judgement trigger pulses in synchronism with the discrimination bits of the pointers received from the latch, and wherein the judgement circuit receives the latched pointers from the latch and receives the judgement trigger pulses from the system control unit, such that for each latched pointer the judgement circuit produces a transfer skip pulse indicating whether the transfer of the corresponding data should proceed.

13. A direct memory access system as recited in claim 12, wherein the judgement circuit comprises:

a first gate receiving the discrimination bit and the judgement trigger pulse corresponding to each pointer and producing a next trigger pulse in response thereto; and a second gate receiving the discrimination bit and the judgement trigger pulse and producing the transfer slip pulse if the discrimination bit has a specific one of two binary values.

* * * * *